US007672500B2

(12) United States Patent
Albeck et al.

(10) Patent No.: US 7,672,500 B2
(45) Date of Patent: Mar. 2, 2010

(54) SYSTEM AND METHOD FOR MONITORING AND VISUALIZING THE OUTPUT OF A PRODUCTION PROCESS

(75) Inventors: Dan Albeck, Giv'at Shmuel (IL); Yishai Galaizer, Neve Mivtach (IL)

(73) Assignee: Cognitens Ltd., Ramat Hasharon (IL)

( * ) Notice: Subject to any disclaimer, the term of this patent is extended or adjusted under 35 U.S.C. 154(b) by 0 days.

(21) Appl. No.: 10/556,409

(22) PCT Filed: Jul. 25, 2004

(86) PCT No.: PCT/IL2004/000676

§ 371 (c)(1),
(2), (4) Date: Jul. 11, 2006

(87) PCT Pub. No.: WO2005/010627

PCT Pub. Date: Feb. 3, 2005

(65) Prior Publication Data

US 2007/0031024 A1 Feb. 8, 2007

(51) Int. Cl.
*G06K 9/00* (2006.01)
(52) U.S. Cl. ..................................... 382/141
(58) Field of Classification Search ................. 382/141
See application file for complete search history.

(56) References Cited

U.S. PATENT DOCUMENTS

| 5,175,688 | A | * | 12/1992 | Sasaki et al. ................. 700/180 |
| 5,335,293 | A | * | 8/1994 | Vannelli et al. ............. 382/110 |
| 5,844,801 | A | * | 12/1998 | Kodama et al. ............. 700/110 |
| 6,415,197 | B1 | * | 7/2002 | Prewitt ......................... 700/117 |
| 6,477,432 | B1 | * | 11/2002 | Chen et al. ..................... 700/51 |
| 2003/0071646 | A1 | * | 4/2003 | Neo et al. ..................... 324/765 |
| 2005/0286753 | A1 | * | 12/2005 | Ho .............................. 382/141 |

OTHER PUBLICATIONS

PolyWorks™ software, version 7.2.
Seven Computer Generated Screen Shots, Unknown Author, Publisher and Place of Publication.
Invoice to Honda R&D Americas, Inc., for PolyWorks™ software dated May 27, 2003, Innovmetric Software, Inc.
Invoice to the Standard Products Co., for PolyWorks™ software dated Nov. 28, 2001, Innovmetric Software, Inc.
Invoice to Venture Industries, Inc., for PolyWorks™ software dated Nov. 27, 2000, Innovmetric Software, Inc.
User's Guide Version 5.1 for Windows and UNIX, May 2000, PolyWorks (R), Modeling and Inspection Software for 3D Digitizers, by InnovMetric Software Inc. p. 4-6.

(Continued)

*Primary Examiner*—Bhavesh M Mehta
*Assistant Examiner*—Michael Vanchy, Jr.
(74) *Attorney, Agent, or Firm*—The Nath Law Group; Derek Richmond; Jiaxiao Zhang

(57) ABSTRACT

A system for monitoring and visualizing the output of a production process, whose output materials or items are inspected by one or more inspection units, may include a communication module to receive data from the one or more inspection units. The received data may be associated with a measured or extrapolated value of at least one parameter of the inspected materials or items. A comparator module may compare at least one of the measured or extrapolated values against a corresponding stored value to determine a difference value, and a visualization module may generate an image representing the inspected items or materials. An area or section of the image corresponding to an area or section of the item or material associated with the at least one of the measured or extrapolated values which was compared to the stored value may be visually coded to indicate a corresponding difference value.

26 Claims, 12 Drawing Sheets

OTHER PUBLICATIONS

User's Guide Version 6.0 for Windows and UNIX, Jan. 2001, IMInspect (R), Comparison and Verification Software, by InnovMetric Software Inc. p. 7-8; and Chapter 11, section 11.5.1.
Reference Guide Version 7.0 for Windows and UNIX, Apr. 2002, IMInspect(R), Comparison and Verification Software, by InnovMetric Software Inc. Chapter 1, pp. 1-1 through 1-5 and 1-7; Chapter 6; Chapter 10, p. 10-4; Chapter 12; and Chapter 15, section 15.8.

* cited by examiner

SYSTEM AND METHOD FOR MONITORING AND VISUALIZING THE OUTPUT OF A PRODUCTION PROCESS

FIELD OF THE INVENTION

The present invention relates generally to the field of quality assurance for production processes. More specifically, the present invention relates to system and method for the visualization and monitoring of the output of a production process.

BACKGROUND

Since the beginning of the industrial revolution, the quality of items and articles of manufacture produced by automated processes has been a major concern of both customers and producers. Tremendous strides have been made in the fields of quality assurance and assembly line inspection systems since the advent of video cameras, laser scanning systems, and various other sensing devices suitable for the inspection of the physical, thermal and chemical characteristics of produced substances and articles of manufacture.

For example, there exist today various inspection systems which can scan or otherwise measure the surface of a manufactured item, and can produce a three dimensional computer model of the scanned item. Various parameters of a scanned and/or inspected item, for example physical dimensions of the item, can be compared to a stored set of values associated with target values for the various parameters, and the deviations from the measured and stored values can be used to assess the quality of the inspected product. Typically, the larger the number of measurements taken by an inspection system, the more reliable it is considered. Many inspection systems today may make or extrapolate thousands, hundreds of thousand, and even millions of measurements for each inspected item.

A comparison of scanned or otherwise measured values from an inspected item can be made with a stored set of values, where the stored values typically represent target values, and can be visualized with the aid of a computer. A computer or any other computing platform having a human interface may produce a graphical representation (i.e. computer model) of scanned or otherwise measured data from an inspected item. As part of the visualization of an inspected item, deviations of measured parameter values from stored values may be indicated on a computer generated graphical representation of the inspected item.

Although great strides have been made in the inspection of individual materials or items produced in series as part of an automated process, there continues to be a need for improved methods and systems for the monitoring and visualization of the output of processes. There is a need for improved methods and systems for the visualization of manufacturing deviations across a set of items produced by a process. There also exists a need for improved methods and systems for the detection of fluctuations or instabilities in processes. And, there exists a need for improved methods and systems for the visualizing of data collected from inspected items, such that the collected data is understandable to a person monitoring a process by which the item is produced, and so that defects on an individual item and fluctuations across a process, which fluctuations may produce variations in defects across multiple items produced by the process, may be perceived by the person monitoring the process.

SUMMARY OF THE INVENTION

According to some embodiments of the present invention, a system for visualizing the output of a production process whose output materials or items are inspected by one or more inspection units, may include a communication module to receive data from the one or more inspection units, wherein the received data may be associated with a measured or extrapolated value of at least one parameter of the inspected materials or items. A comparator module may compare at least one of the measured or extrapolated values against a corresponding stored value to determine a difference value, and a visualization module may generate an image representing the inspected items or materials, wherein an area or section of the image corresponding to an area or section of the item or material associated with the at least one of the measured or extrapolated values which was compared to the stored value may be visually coded to indicate the corresponding difference value.

According to some embodiments of the present invention, points, areas, sections, or regions from each image produced according to some embodiments of the present inventions, may further be inspected so as to detect production process deviations across a single item or material produced by the process. Inspection of the above mentioned points, areas, sections or regions may include running one or more mathematical operators and/or algorithms on the data or data set used by the visualization module to generate the given points, areas, sections, or regions of the image. According to further embodiments of the present invention, the one or more mathematical operators and/or algorithms may include a Fourier transform, a cosine transform, or any other frequency domain transform. Furthermore, various digital filtering algorithms and structures (e.g. hi-pass filter) may be applied to the data set in order to detect deviations.

According to some further embodiments of the present invention, corresponding points, areas, sections, and/or regions from a series of images produced according to some embodiments of the present inventions, may be further inspected to detect production process deviations across multiple items or materials which are the output of a production process. Inspection of the above mentioned points, areas, sections or regions may include running one or more mathematical operators and/or algorithms on the data or data set used by the visualization module to generate the given points, areas, sections, or regions of the image. According to further embodiments of the present invention, the one or more mathematical operators and/or algorithms may include a Fourier transform, a cosine transform, or any other frequency domain transform. Furthermore, various digital filtering algorithms and structures (e.g. hi-pass filter) may be applied to the data set in order to detect deviations.

According to some embodiments of the present inventions, visual coding of a point, an area, a section or a region of an image may include applying either a texture or a color there, wherein either the texture and/or the color may be correlated to the difference value. According to some embodiments of the present invention, quantization and reduction in size of large data sets may be performed concurrently or prior to visual coding. For example, if visual coding is performed using colors, each of a set of colors may be associated with a specific range of difference values, and when generating the image an entire range of difference values may be mapped to a single color. In an alternate embodiment, each of a set of colors may be associated with a single specific value and the difference value to be visually displayed on the image may be first quantized so as to correspond with one of the values associated with one of the colors.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
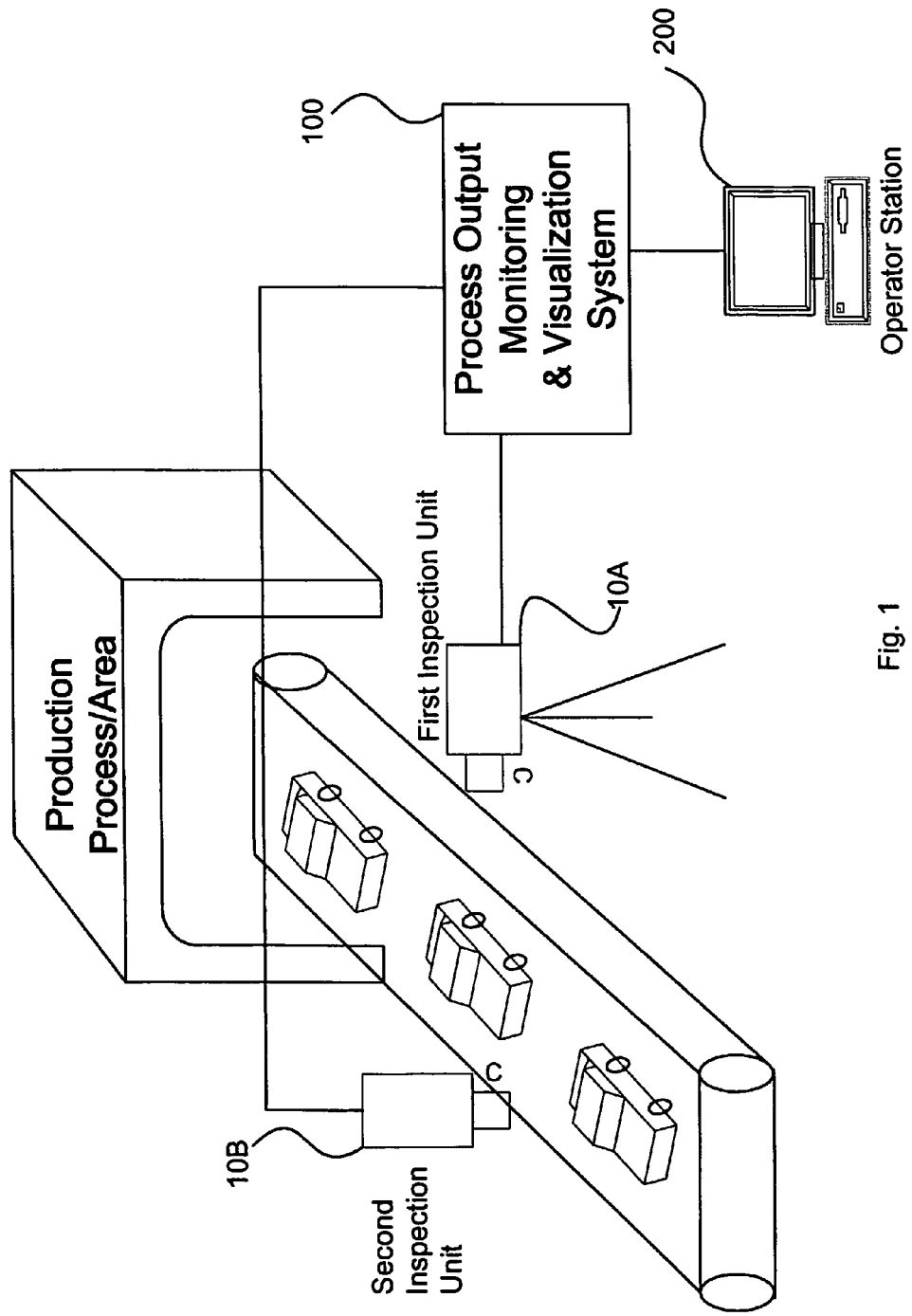
FIG. 1 is a conceptual block diagram illustrating a possible production line inspection system usable with a process monitoring and visualization system according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

According to some embodiments of the present invention, a system for visualizing the output of a production process whose output materials or items are inspected by one or more inspection units, may include a communication module to receive data from the one or more inspection units, wherein the received data may be associated with a measured or extrapolated value of at least one parameter of the inspected materials or items. A comparator module may compare at least one of the measured or extrapolated values against a corresponding stored value to determine a difference value, and a visualization module may generate an image representing the inspected items or materials, wherein an area or section of the image corresponding to an area or section of the item or material associated with the at least one of the measured or extrapolated values which was compared to the stored value may be visually coded to indicate the corresponding difference value.

According to some embodiments of the present invention, points, areas, sections, or regions from each image produced according to some embodiments of the present inventions, may further be inspected so as to detect production process deviations across a single item or material produced by the process. Inspection of the above mentioned points, areas, sections or regions may include running one or more mathematical operators and/or algorithms on the data or data set used by the visualization module to generate the given points, areas, sections, or regions of the image. According to further embodiments of the present invention, the one or more mathematical operators and/or algorithms may include a Fourier transform, a cosine transform, or any other frequency domain transform. Furthermore, various digital filtering algorithms and structures (e.g. hi-pass filter) may be applied to the data set in order to detect deviations.

According to some further embodiments of the present invention, corresponding points, areas, sections, and/or regions from a series of images produced according to some embodiments of the present inventions, may be further inspected to detect production process deviations across multiple items or materials which are the output of a production process. Inspection of the above mentioned points, areas, sections or regions may include running one or more mathematical operators and/or algorithms on the data or data set used by the visualization module to generate the given points, areas, sections, or regions of the image. According to further embodiments of the present invention, the one or more mathematical operators and/or algorithms may include a Fourier transform, a cosine transform, or any other frequency domain transform. Furthermore, various digital filtering algorithms and structures (e.g. hi-pass filter) may be applied to the data set in order to detect deviations.

According to some embodiments of the present inventions, visual coding of a point, an area, a section or a region of an image may include applying either a texture or a color there, wherein either the texture and/or the color may be correlated to the difference value. According to some embodiments of the present invention, quantization and reduction in size of large data sets may be performed concurrently or prior to visual coding. For example, if visual coding is performed using colors, each of a set of colors may be associated with a specific range of difference values, and when generating the image an entire range of difference values may be mapped to a single color. In an alternate embodiment, each of a set of colors may be associated with a single specific value and the difference value to be visually displayed on the image may be first quantized so as to correspond with one of the values associated with one of the colors.

Figure 7:
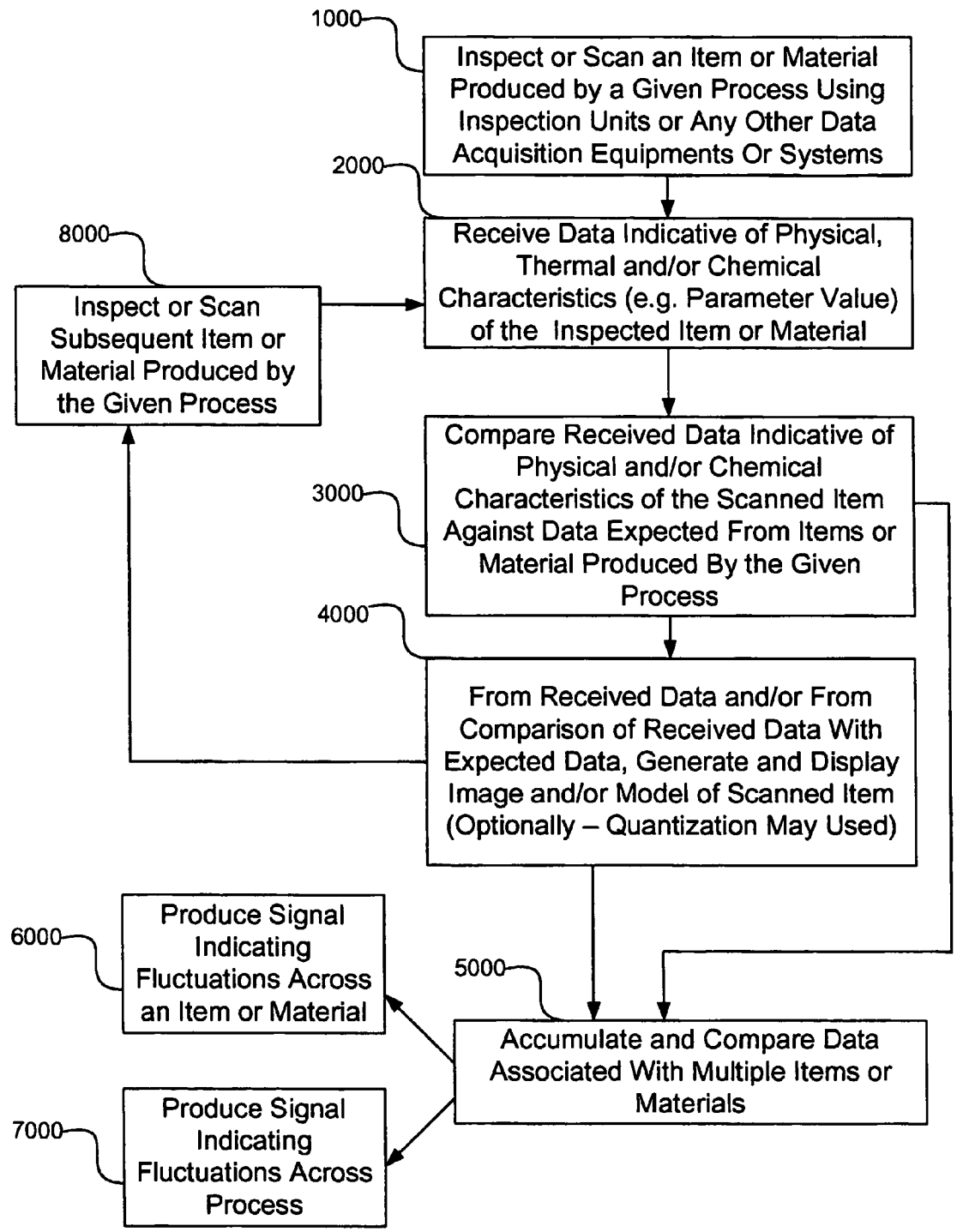
FIG. 7 is a flow chart illustrating various steps associated with a method of monitoring and visualizing the output of a production process according to some embodiments of the present invention.

Turning now to FIG. 1, there is seen a conceptual block diagram illustrating a exemplary production line inspection system usable with a process monitoring and visualization system according to some embodiments of the present invention. Inspection unit(s) 10A and/or 10B may scan or otherwise inspect each of a series of items or material being produced by a production process, which in the example of FIG. 1 is a car production process. Data associated with measured or extrapolated values of various parameters of the inspected items may be produced by the inspection unit(s) 10A and/or 10B and may be sent to a process output monitoring and visualization system 100 according to some embodiments of the present invention. The process output monitoring and visualization system 100 may perform certain functions on the received data in accordance with the steps of the method illustrated in FIG. 7, and may provide image and/or video output through an operator station 200, including a video screen. The operator station 200 may also be used to configure and instruct the monitoring system 100 as to which one or more of a possible set of functions to perform on the received inspection data.

It is well known in the art that various inspection units can be comprised of a large variety of sensing technologies including but not limited to video cameras, a thermal cameras, a laser based ranging and scanning systems, or any other inspection devices known today or to be devised in the future. Some inspection units and systems make numerous direct measurements of various physical, chemical and thermal characteristics of the object being inspected (e.g. laser ranging and scanning system, spectroscope, or thermal camera), while other inspection device may take some direct measurements of one or more parameter values and extrapolate the values of other parameter values based on the directly measured values. For example, some inspection systems known in the art may extrapolate the three-dimensional surface features of an inspected item based on two or more two-dimensional images of the item being inspected.

Typically, inspection units or systems output a data vector or data set containing the values of the various parameters measured or extrapolated by the inspection unit or system. For example, an inspection unit adapted to scan and measure the surface features of an item or material may output a vector map (e.g. a set of three dimensional coordinates x,y,z) representing the physical dimensions or limits of the item. If the inspection unit(s) are also adapted to measure either thermal or chemical characteristics of an inspected item, their output vector may contain a four or five dimensional coordinate set, where for each point (x,y,z) there may also be a variable indicating temperature and/or acidity, for example. Not withstanding the above recitation of inspection units and systems, it should be clear to one of ordinary skill in the art that any inspection system known today or to be devised in the future is applicable to various embodiments of the present invention.

Figure 2:
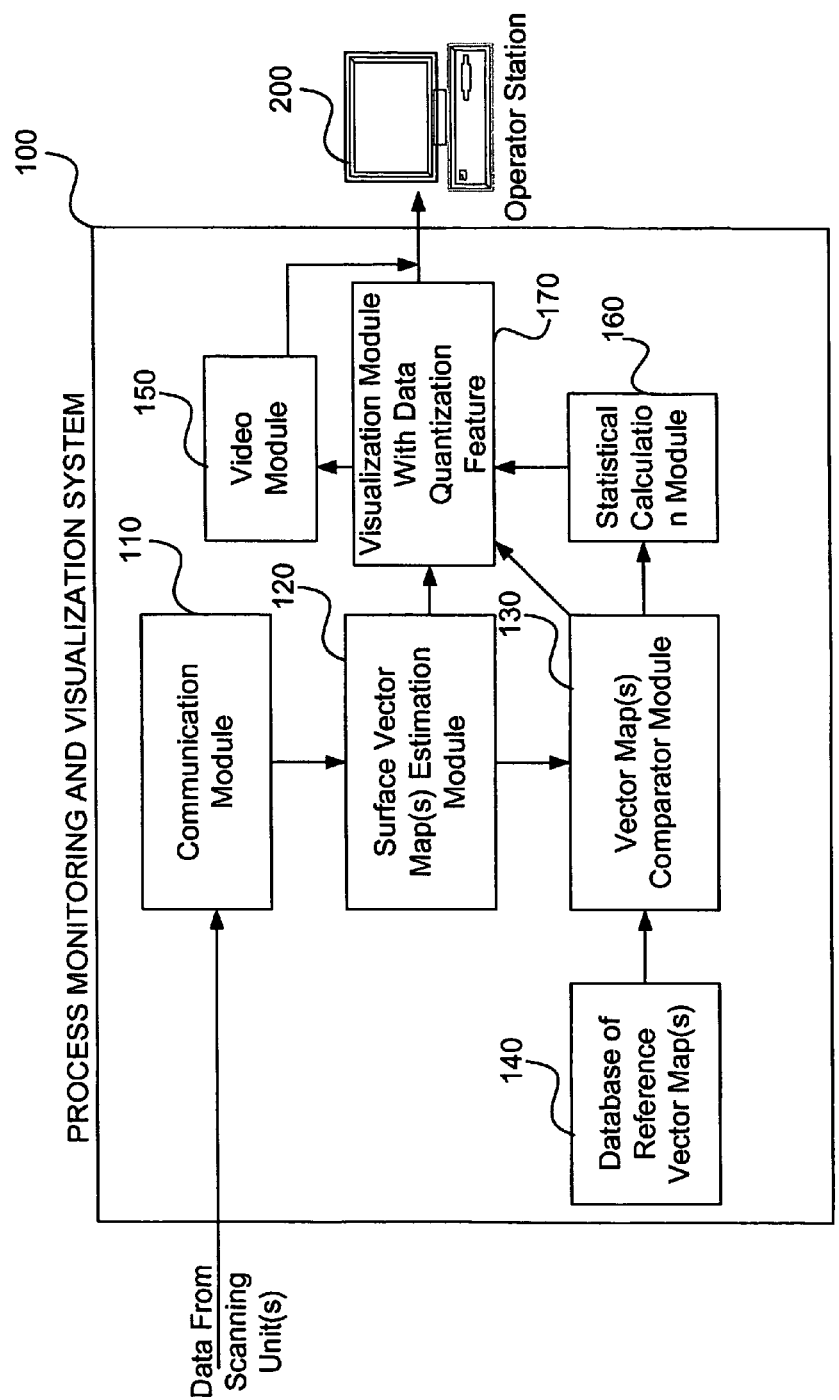
FIG. 2 is block diagram showing functional blocks or modules of a monitoring and visualization system according to some embodiments of the present invention.

Turning now to FIG. 2, there is shown a block diagram of functional blocks or modules of a monitoring and visualization system 100 according to some embodiments of the present invention. As seen in FIG. 2, with reference being made to the steps of FIG. 7, according to some embodiments of the present invention, a communication module 110 may receive data (step 2000) associated with or otherwise containing values of parameters indicative of physical, thermal and/or chemical characteristics of an inspected item or material produced by a production process. Prior to being received as part of step 2000, the data may be acquired by one or more inspection units or systems in accordance with step 1000.

For each process whose output product, item or material which may be monitored and/or visualized according to some embodiments of the present invention, target parameter values may be stored as the standard against which measured or extrapolate parameter values may be compared. Therefore, according to some embodiments of the present invention, a database of reference values, vectors or maps 140 may be maintained. Data received from inspection or scanning units 10 may be formatted into some predefined vector format suitable for comparison with the stored target data, and according to some embodiments of the present invention the received data may further processed or combined with stored data in order to produce a vector map representing one or more surfaces of the item or material which as been scanned. Surface vector map estimation module 120, for example, may be used to generate a vector map representing an inspected item based on direct and extrapolated measurements of the surface of the item. According to further embodiments of the present invention, the vector map estimation module 120 may combine data representing values of thermal and/or chemical parameters of an inspected item or material with a predefined vector map representing the physical features or share of the item, thereby producing a composite vector map indicating the thermal and/or chemical characteristics of the inspected item or material at different points or along different areas of the item or material.

A vector map comparator module 130, according to some embodiments of the present invention, may compare parameters values of an inspected product to stored values (step 3000), which stored values may be target parameter values for the given inspected product.

Figure 3:
FIG. 3 is an exemplary computer generated image representing a possible output image of a process monitoring and visualization system according to some embodiments of the present invention.
Figure 4:
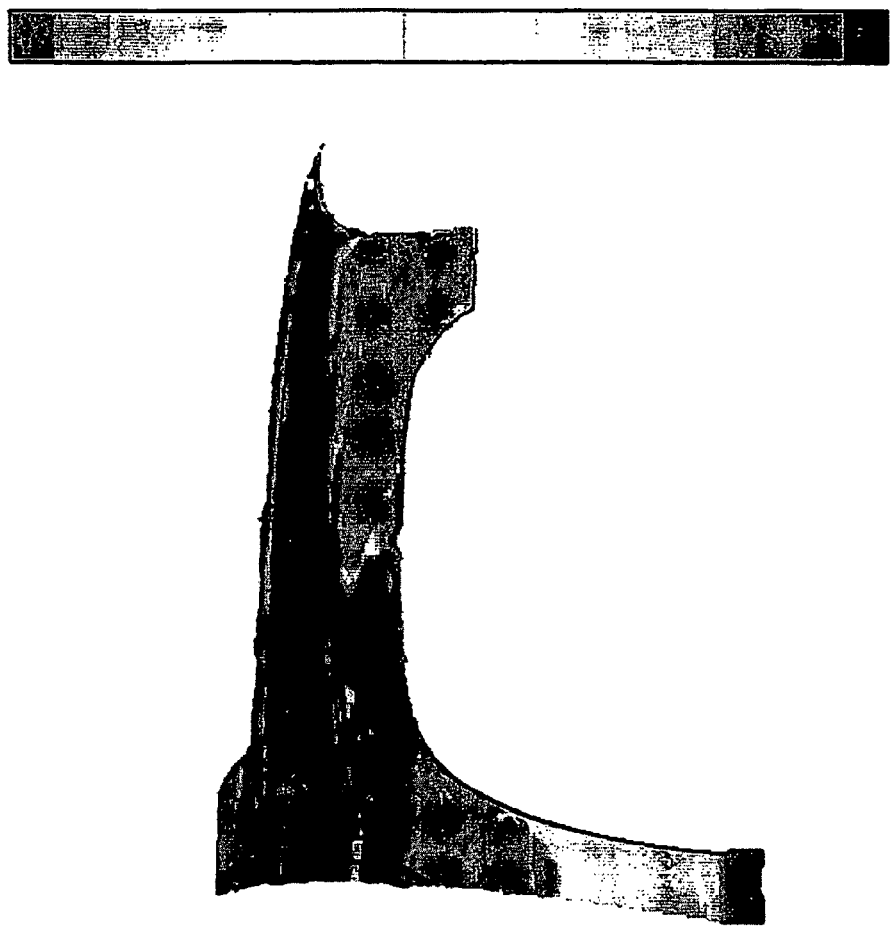
FIG. 4 is a second exemplary computer generated image representing a possible output image, including visual coding and color quantization, of a process monitoring and visualization system according to some embodiments of the present invention.

A visualization module 170 may generate an image based on the received data associated with parameter values of the inspected product (step 4000). FIG. 3 shows an exemplary computer generated image representing a possible output image of the visualization module. In this example and in all the examples of this application, the item is a car fender produced by an automated metal cutting and pressing process. The visualization module 170 may also generate an image based on a comparison the received data and the stored target data. According to certain embodiments of the present invention, the visualization module 170 may perform visual coding of the image, as seen in FIG. 4, and as part of the visual coding may perform some level of quantization of the data which is visually coded on the image, as exemplified by the "range to color translation key" on the side of FIG. 4.

Figure 5:
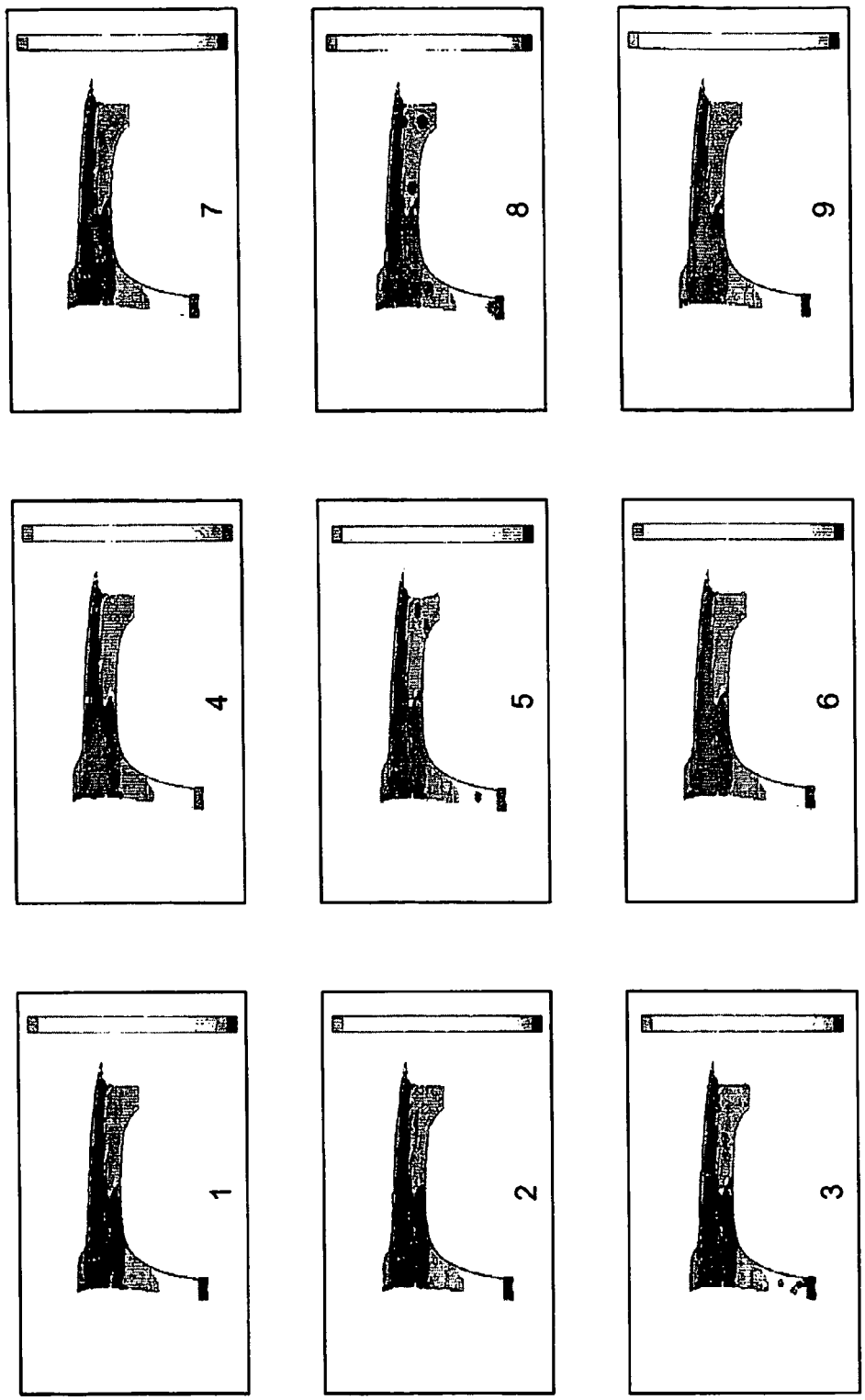
FIG. 5 is series of exemplary computer generated images representing a series of possible output images, where each image is associated with a separate produced material or item monitored and visualized by a monitoring and visualization system according to some embodiments of the present invention.
Figure 6A:
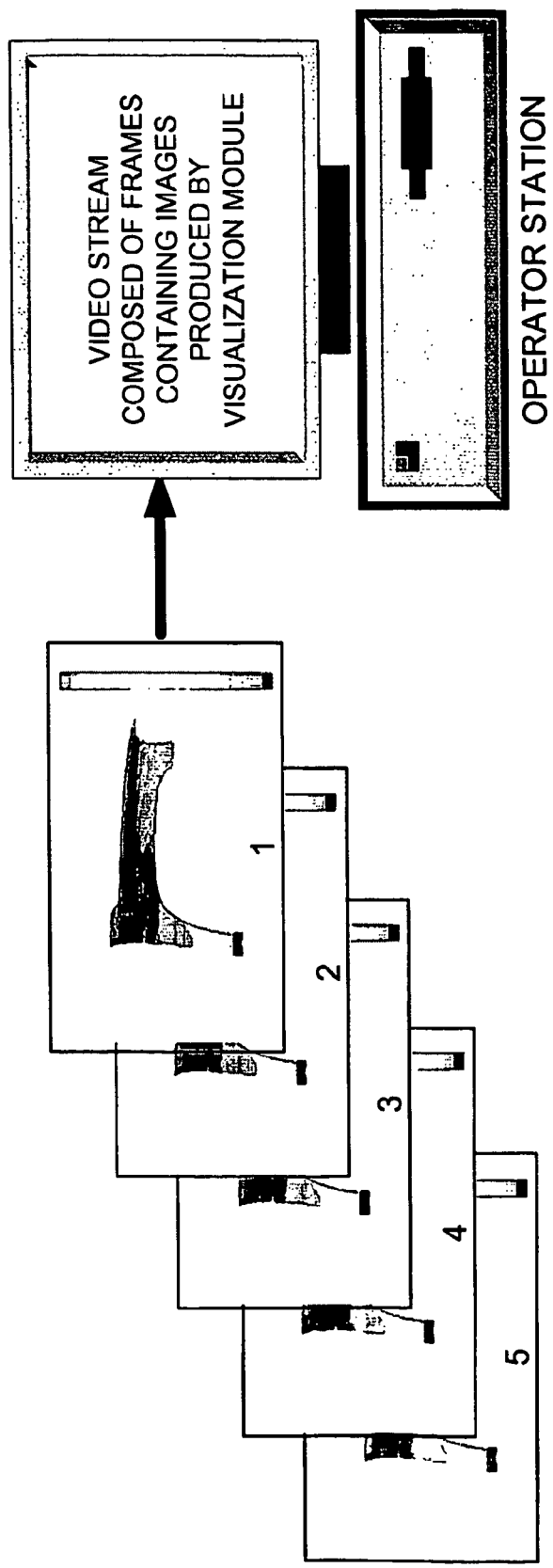
FIG. 6A is a conceptual block diagram illustrating how exemplary images, such as those shown in FIG. 4, may be combined serially into a single video stream to be displayed.

When multiple products (i.e. items or materials) produced by a process are monitored according to some embodiments of the present invention (step 8000), multiple sets of parameter values, one set per product, may be collected and processed, and a series of images may be generated by the visualization module 170. FIG. 5 is series of exemplary computer generated images representing a series of possible output images, where each image is associated with a separate produced material or item monitored and visualized according to some embodiments of the present invention. Video module 150 may combine a series of images, as shown in FIG. 5, in a serial manner to produce a video stream. FIG. 6A shows a conceptual block diagram illustrating how images produced by the visualization module 170 may be combined into a single video stream by the video module 150 to be displayed serially.

As part of some embodiment of the present invention, an observer monitoring the output of a production line or process may view a video stream with visual coding, where the visual coding is indicating process deviations on each of the products. By viewing a series of images (e.g. video stream) the observer may be able to perceive and detect both excessive process deviations on a given product and/or an increasing degradation in the production process (i.e. an unstable process), as would be indicated by increasing detected deviations or fluctuations in detected deviations in successive products.

Figure 6B:
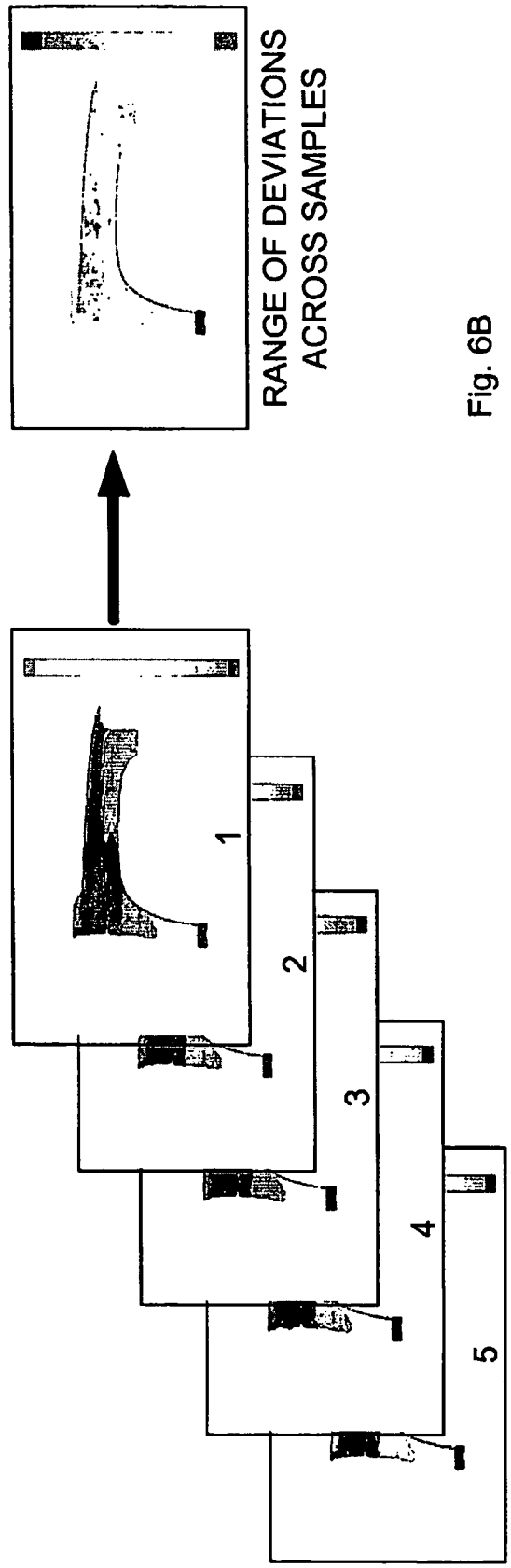
FIG. 6B is a conceptual block diagram illustrating how statistical processing may be performed on data underlying a series of images, such as the one in FIG. 4, to produce a single image with visual coding representing the range of deviations or difference values at corresponding points, across multiple items produced by the process.

According to some embodiments of the present invention, statistical calculation module 160 may perform one or a series of statistical analysis operations on data sets representing parameter values of monitored items. For example, as shown in FIG. 6B, the statistical calculation module 160 may perform a range determination operation between all the data sets representing parameter values from each of the sampled (e.g. inspected and/or visualized) items and produce a single data set which when visualized by visualization module 170 may produce an image where the visual coding at each point on the item is correlated to the range of the values of the corresponding points on the sampled items. That is, the color or texture used to code a given point on the image on the right of FIG. 6B is correlated to the range of parameter values visually coded on corresponding points in the series of images representing sampled or inspected items. It should be clear to one of ordinary skill in the art that a range determination or tracking operation may be performed on any number of samples, and any number of points on any number of samples.

Figure 6C:
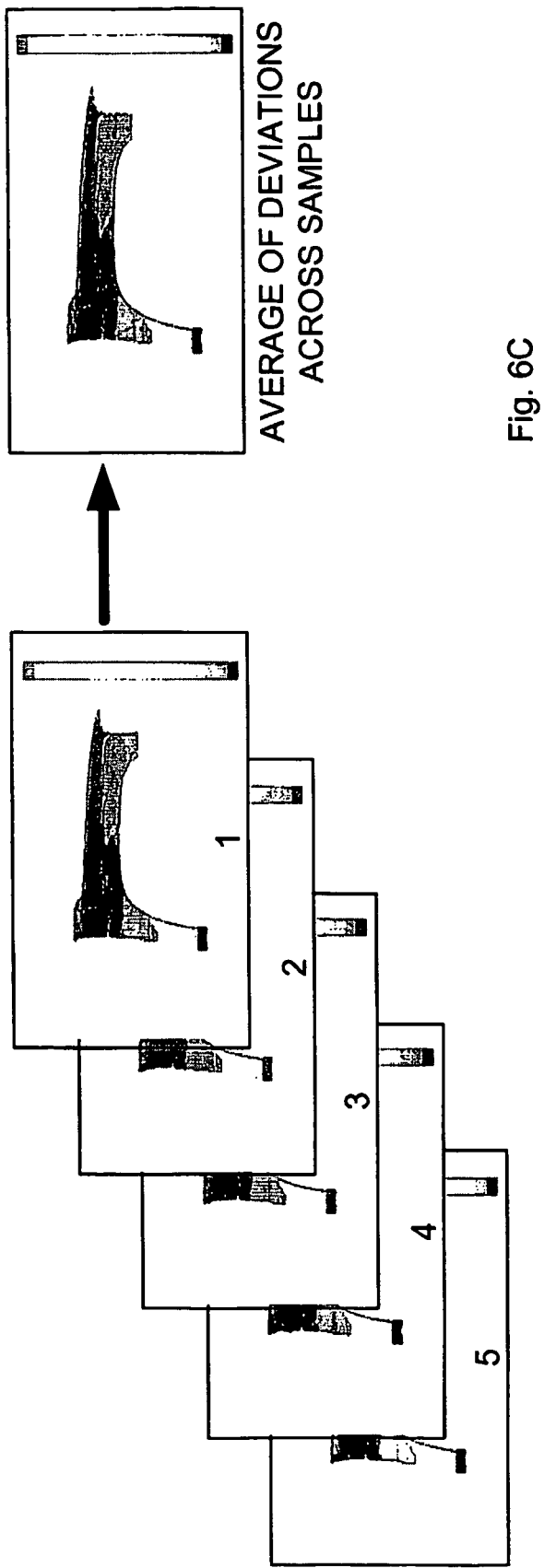
FIG. 6C is a conceptual block diagram illustrating how statistical processing may be performed on data underlying a series of images, such as the one in FIG. 4, to produce a single image with visual coding representing the average of deviations at corresponding points, across multiple items produced by the process.

According to some embodiments of the present invention, statistical calculation module 160 may perform one or a series of statistical analysis operations on data sets representing parameter values of monitored items. For example, as shown in FIG. 6C, the statistical calculation module 160 may perform an averaging operation between all the data sets representing parameter values from each of the sampled (e.g. inspected and/or visualized) items and produce a single data set which when visualized by visualization module 170 may produce an image where the visual coding at each point on the item is correlated to the average of the values of the corresponding points on the sampled items. That is, the color or texture used to code a given point on the image on the right of FIG. 6C is correlated to the average of parameter values visually coded on corresponding points in the series of images representing sampled or inspected items. It should be clear to one of ordinary skill in the art that an averaging calculation may be performed on any number of samples, and any number of points on any number of samples.

Figure 6D:
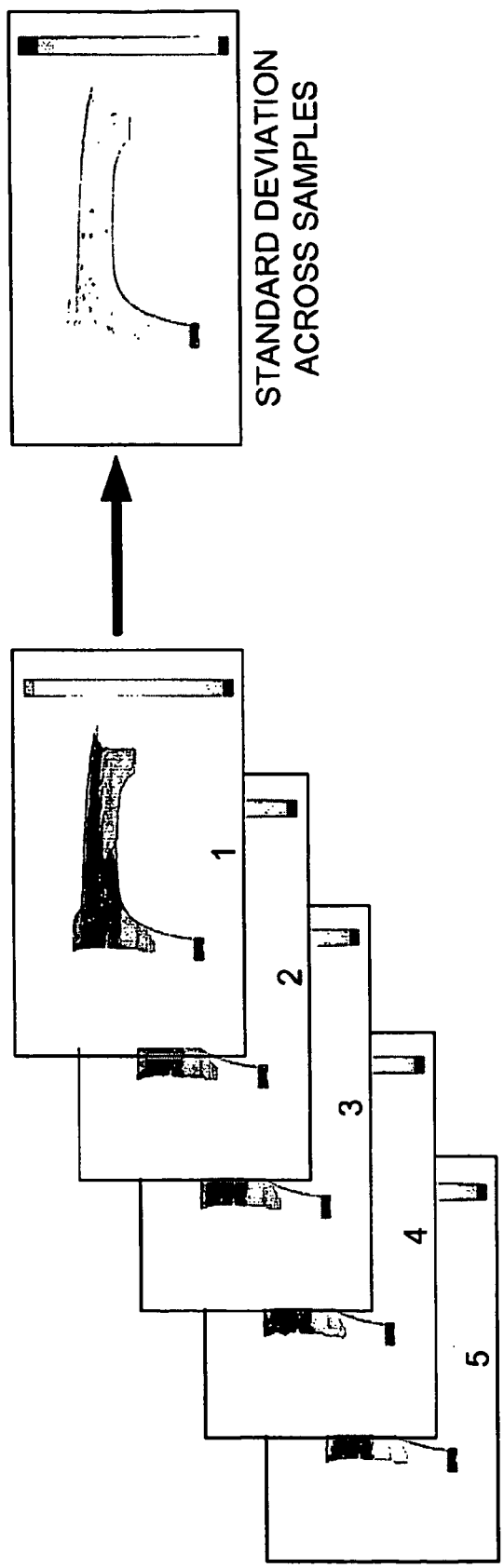
FIG. 6D is a conceptual block diagram illustrating how statistical processing may be performed on data underlying a series of images, such as the ones in FIG. 4, to produce a single image with visual coding representing the standard deviations at corresponding points, across multiple items produced by the process.

According to some embodiments of the present invention, statistical calculation module 160 may perform one or a series of statistical analysis operations on data sets representing parameter values of monitored items. For example, as shown in FIG. 6D, the statistical calculation module 160 may perform a standard deviation operation between all the data sets representing parameter values from each of the sampled (e.g. inspected and/or visualized) items and produce a single data set which when visualized by visualization module 170 may produce an image where the visual coding at each point on the item is correlated to the standard deviation of the values of the corresponding points on the sampled items. That is, the color or texture used to code a given point on the image on the right of FIG. 6D is correlated to the standard deviation of parameter values visually coded on corresponding points in the series of images representing sampled or inspected items. It should be clear to one of ordinary skill in the art that a standard deviation calculation may be performed on any number of samples, and any number of points on any number of samples.

It should be clear to one or ordinary skill in the art that statistical calculation module 160 may perform any one or a combination of statistical analysis operations on or across data sets representing one or more parameter values from inspected or scanned items or materials. Any statistical analysis operation known today or to be devised in the future is applicable to the present invention.

Figure 8:
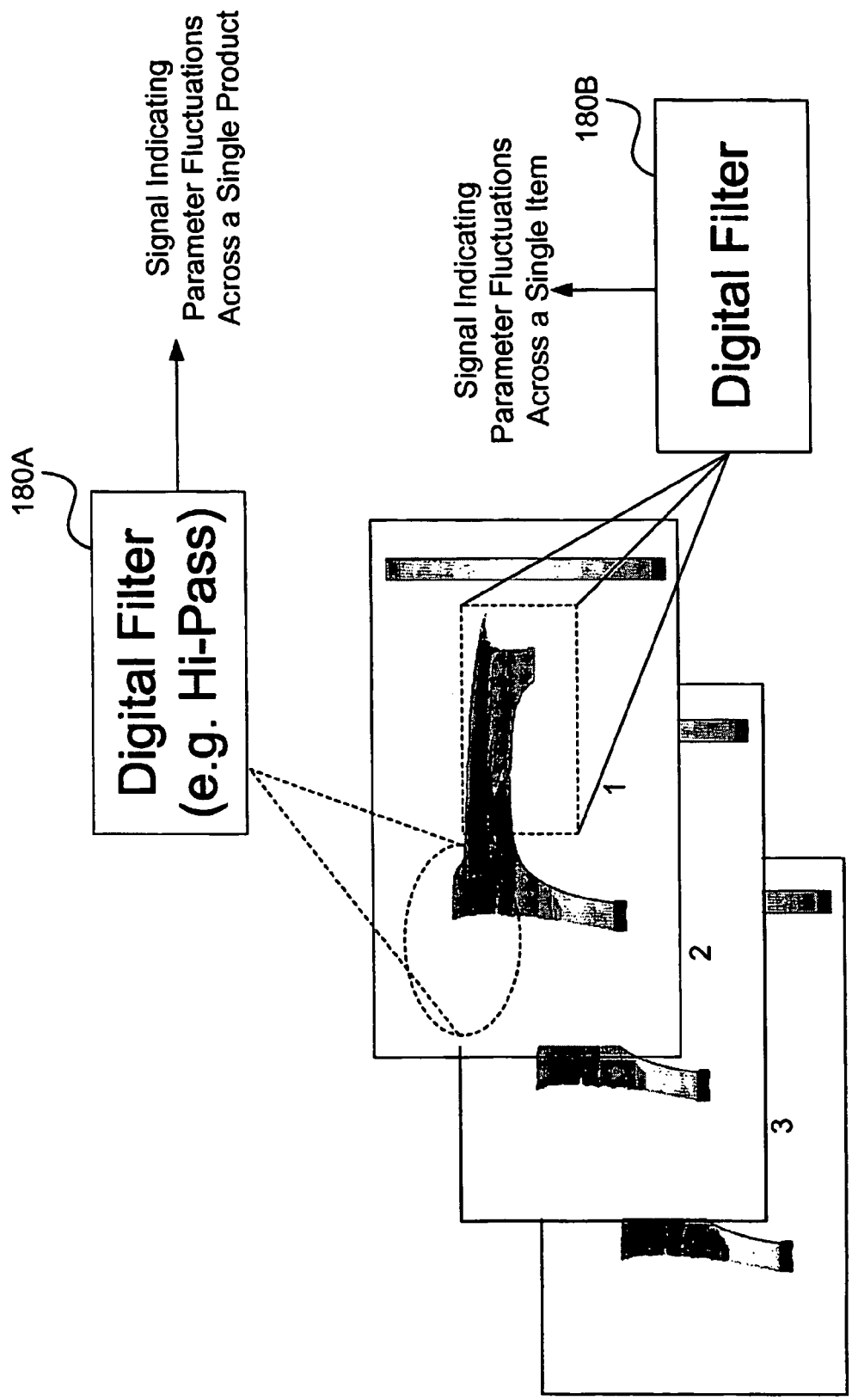
FIG. 8 is a conceptual block diagram illustrating points, areas, sections, or regions from each image produced according to some embodiments of the present inventions, by may be further inspected to detect production process deviations across a single item or material inspected according to a further embodiment of the present invention.

According to some embodiments of the present invention, various digital filters may be used to detect unstable production processes. Turning now to FIG. 8, there is shown a conceptual block diagram illustrating how points, areas, sections, or regions from each image produced according to some embodiments of the present inventions, may be inspected to detect production process deviations across a single item or material. In the example of FIG. 8, data representing measure or extrapolated parameter values and/or deviation values associated with various points, areas, section of regions of an inspected product may be passed through a high pass digital filter 180, and the filter 180 may output a signal when there are relatively high frequency components in the data, thus indicating substantial fluctuation in deviation from target values.

Figure 9:
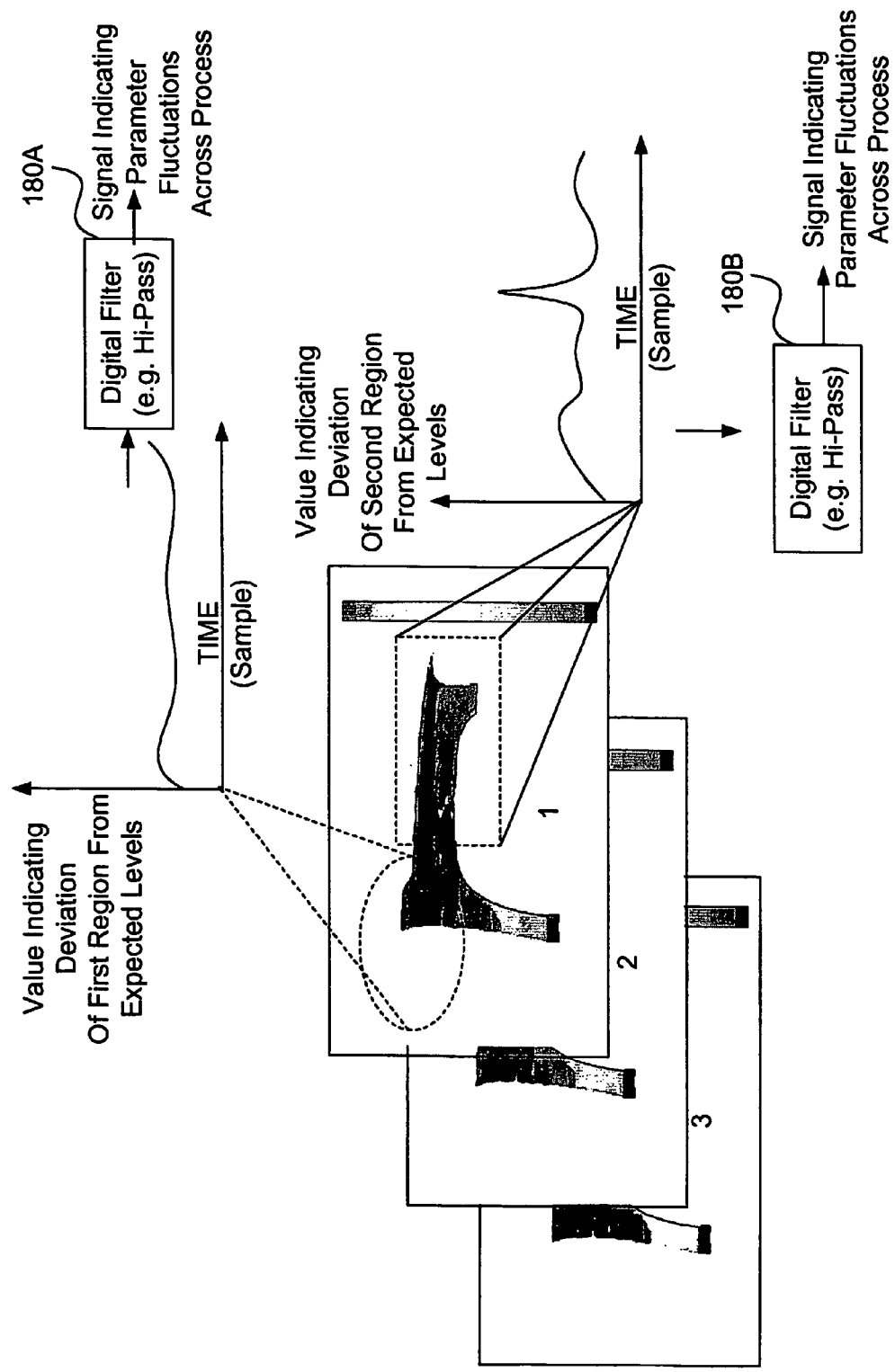
FIG. 9 is a conceptual block diagram illustrating how corresponding points, areas, sections, and/or regions from a series of images produced according to some embodiments of the present inventions, may be further inspected to detect production process deviations across multiple items or materials which are the output of a production process.

According to a further embodiment of the present invention, corresponding points, areas, sections, and/or regions from a series of images produced according to some embodiments of the present inventions, may be further inspected to detect production process deviations across multiple items or materials which are the output of a production process. Turning now to FIG. 9, there is seen how corresponding points, areas, sections or regions on a series of products may be inspected, for example by averaging the difference of parameter deviations across the inspected area, and comparing the resulting deviation indicator with the resulting deviation indicator of corresponding areas on a successive products produced by the given process. According to the example of FIG. 9, the top inspected region has relatively small fluctuations, as can be seen in the associated graph, while the lower area has relatively higher deviations and fluctuations. When passing the series of deviation indicators from the upper area through high pass filter 180A, the filter should not generate any signal due to the fact that the series of indicator values from the upper area don't have a high frequency component (i.e. indicating a stable process), and thus the high pass filter should substantially attenuate the digital signal. Conversely, when passing the series of deviation indicators from the lower area through high pass filter 180B, the filter should generate a single due to the fact that the series of indicator values from the lower area has high frequency components (i.e. indicating an unstable process), and thus the high pass filter should substantially pass the high frequency components of the digital signal.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed:

1. A method for visualizing the output of a production process comprising:
   (a) inspecting a first plurality of materials or items produced by the production process, each said inspected material or item comprising a second plurality of points, areas, sections or regions;
   (b) for each inspected material or item, providing parameter values of one or more parameters associated with each one of said second plurality of points, areas, sections or regions of the respective inspected material or item;
   (c) performing statistical analysis for at least one data set of said parameter values, wherein said parameter values of the or each data set are obtained for a respective set of corresponding said points, areas, sections or regions taken across said first plurality of inspected materials or items, to generate statistical data associated with said respective set of said points, areas, sections or regions; and
   (d) using a computing device to generate a digital image of a said single material or item collectively representing said plurality of said inspected materials or items, wherein a corresponding point, area, section or region of the image representative of the or each respective set of said points, areas, sections or regions of the plurality of inspected materials or items is visually coded to indicate the said statistical data obtained in step (c) corresponding thereto.

2. The method according to claim 1, wherein said parameter values in step (b) are provided by directly measuring or extrapolating said parameter values of each inspected material or item.

3. The method according to claim 2, wherein the measured or extrapolated parameter value is compared with a stored value representing a target value for the parameter.

4. The method according to claim 3, wherein visual coding an area or a section comprises applying a color to the area or section, wherein the color is associated with the value or difference value.

5. The method according to claim 4, wherein each of a set of colors is associated with a range of possible values or difference values.

6. The method according to claim 4, wherein each of a set of colors is associated with a specific value and the difference value is quantized so as to correspond with one of the values associated with one of the colors.

7. The method according to claim 2, wherein visual coding an area or a section comprises applying a texture to the area or section, wherein the texture is associated with the value or difference value.

8. The method according to claim 2, further comprising the step of comparing at least one of the measured or extrapolated values against a corresponding stored value to determine difference value prior to step (c), and wherein step (c) comprises performing statistical analysis on the corresponding measured or extrapolated parameter values and or difference values associated with each set of corresponding points across multiple said inspected materials or items produced by said process to derive a statistical analysis based data set including statistical data at each said corresponding point, area, section or region.

9. The method according to claim 1, further comprising visually displaying said digital image including said at least one point, area, section or region of the image visually coded to represent the respective statistical data corresponding thereto.

10. The method according to claim 1, wherein the type of statistical analysis performed includes standard deviation calculation.

11. The method according to claim 1, wherein the type of statistical analysis performed includes range determination.

12. The method according to claim 1, wherein the type of statistical analysis performed includes averaging.

13. The method according to claim 1, wherein said at least one point, area, section or region of the image is represented by x, y, and z coordinates.

14. A system for visualizing the output of a production process whose output materials or items are inspected by one or more inspection units, said system comprising:
   a communication module configured for receiving data from the one or more inspection units, wherein the received data is associated with parameter values of one or more parameters for each of a plurality of points, areas, sections or regions of each inspected material or item, corresponding to respective points, areas, sections or regions of other said inspected materials or items;

a statistical calculation module configured for performing statistical analysis for at least one data set of said parameter values, wherein said parameter values of the or each data set are obtained for a respective set of corresponding said points, areas, sections or regions taken across said inspected materials or items, to generate statistical data associated with said respective set of said points, areas, sections or regions; and a computing device configured for generating a digital image of a said single material or item collectively representing said plurality of said inspected materials or items, wherein a corresponding point, area, section or region of the image representative of the or each respective set of said points, areas, sections or regions of the plurality of inspected materials or items is visually coded to indicate the said statistical data obtained by said statistical calculation module corresponding thereto.

15. The system according to claim 14, wherein said parameter values are directly measured or extrapolated values of each inspected material or item.

16. The system according to claim 15, wherein the measured or extrapolated parameter value is compared with a stored value representing a target value for the parameter.

17. The system according to claim 16, wherein said visualization module visually codes an area or a section by applying a color to the area or section, wherein the color is associated with the value or difference value.

18. The system according to claim 17, wherein each of a set of colors is associated with a range of possible values or difference values.

19. The system according to claim 17, wherein each of a set of colors is associated with a specific value and the difference value is quantized so as to correspond with one of the values associated with one of the colors.

20. The system according to claim 15, further comprising a comparator module configured for comparing at least one of the measured or extrapolated values against a corresponding stored value to determine a difference value prior to generating a digital image, and wherein said statistical calculation module is configured for performing statistical analysis on the corresponding measured or extrapolated parameter values and or difference values associated with each set of corresponding points across multiple said inspected materials or items produced by said process to derive a statistical analysis based data set including statistical data at each said corresponding point, area, section or region.

21. The system according to claim 20, wherein said visualization module visually codes an area or a section by applying a texture to the area or section, wherein the texture is associated with the value or difference value.

22. The system according to claim 14, comprising a visualization module adapted for visually displaying said digital image including said at least one point, area, section or region of the image visually coded to represent the respective statistical data corresponding thereto.

23. The system according to claim 14, wherein the type of statistical analysis performed by said statistical calculation module includes averaging.

24. The system according to claim 14, wherein the type of statistical analysis performed by said statistical calculation module includes range determination.

25. The system according to claim 14, wherein the type of statistical analysis performed by said statistical calculation module includes standard deviation calculation.

26. The system according to claim 14, wherein said at least one point, area, section or region of the image is represented by x, y, and z coordinates.

* * * * *

UNITED STATES PATENT AND TRADEMARK OFFICE
CERTIFICATE OF CORRECTION

| | | |
|---|---|---|
| PATENT NO. | : 7,672,500 B2 | Page 1 of 1 |
| APPLICATION NO. | : 10/556409 | |
| DATED | : March 2, 2010 | |
| INVENTOR(S) | : Dan Albeck and Yishai Galatzer | |

It is certified that error appears in the above-identified patent and that said Letters Patent is hereby corrected as shown below:

Title Page,

Please delete the following:

"(75) Inventors: Dan Albeck, Giv'at Shmuel (IL); Yishai Galaizer, Neve Mivtach (IL)" and replace with the following on the front page of the patent:

-- (75) Inventors: Dan Albeck, Giv'at Shmuel (IL); Yishai Galatzer, Neve Mivtach (IL) --

Title Page,

Please add in the following:

(60) Provisional application No. 60/491,329, filed on July 24, 2003.

Signed and Sealed this
First Day of February, 2011

David J. Kappos
*Director of the United States Patent and Trademark Office*